(12) United States Patent
Lenz, Jr. et al.

(10) Patent No.: US 10,919,367 B2
(45) Date of Patent: Feb. 16, 2021

(54) POSITIVE PRESSURE VENTILATION SYSTEM FOR FIREFIGHTING APPARATUS

(71) Applicant: HME, Incorporated, Wyoming, MI (US)

(72) Inventors: Kenneth C. Lenz, Jr., Hudsonville, MI (US); Kevin J. Longhurst, Grand Rapids, MI (US)

(73) Assignee: HME, Incorporated, Wyoming, MI (US)

( * ) Notice: Subject to any disclaimer, the term of this patent is extended or adjusted under 35 U.S.C. 154(b) by 302 days.

(21) Appl. No.: 16/175,010

(22) Filed: Oct. 30, 2018

(65) Prior Publication Data
US 2020/0130476 A1 Apr. 30, 2020

(51) Int. Cl.
*B60H 3/06* (2006.01)
*A62C 27/00* (2006.01)

(52) U.S. Cl.
CPC .......... *B60H 3/0641* (2013.01); *A62C 27/00* (2013.01); *B60H 3/0658* (2013.01)

(58) Field of Classification Search
CPC .............................. A62C 27/00; B60H 3/0658
USPC ...................... 454/83, 173–183, 108, 88, 112
See application file for complete search history.

(56) References Cited

U.S. PATENT DOCUMENTS

| 3,477,243 | A | * | 11/1969 | Schroeder | ............. F25D 25/005 62/298 |
| 3,509,810 | A | | 5/1970 | Riester | |
| 9,968,811 | B2 | * | 5/2018 | Lenz, Jr. | ................ A62C 27/00 |
| 2010/0240293 | A1 | * | 9/2010 | Isaman | ................... B60H 1/262 454/108 |
| 2017/0305231 | A1 | | 10/2017 | Bode et al. | |

FOREIGN PATENT DOCUMENTS

JP            5548407            7/2014

* cited by examiner

*Primary Examiner* — Vivek K Shirsat
(74) *Attorney, Agent, or Firm* — Warner Norcross + Judd, LLP

(57) ABSTRACT

A firefighting apparatus has a positive pressure ventilation system for impairing dust, dirt, and other debris from entering a storage compartment of the apparatus. The system can blow dust, dirt and debris out from the storage compartment if the same enters the compartment. The positive pressure ventilation system includes a blower assembly that supplies a positive flow of air to the storage compartment, such that the pressure within the storage compartments is greater than the environment, and air will egress from the storage compartment into the surrounding environment, rather than entering the storage compartment from the surrounding environment.

18 Claims, 8 Drawing Sheets

POSITIVE PRESSURE VENTILATION SYSTEM FOR FIREFIGHTING APPARATUS

BACKGROUND OF THE INVENTION

The present invention relates to a firefighting apparatus, such as a fire truck or other vehicle, and more particularly, to a firefighting apparatus including a ventilation system for removing dust, dirt, and other debris from body compartments of the apparatus.

There are a variety of fire trucks and rescue vehicles that include storage areas for storing equipment useful in rescue and firefighting operations. These storage areas come in many forms. Many fire trucks, include a body having multiple storage compartments rearward of the cab. These storage compartments typically are located on and accessible from lateral sides of the fire truck. In certain environments, the fire trucks traverse dusty and dirty terrain, particularly those fire trucks specialized to address vegetation or wildland fires, or to respond to emergencies in the back country. When driving through such terrain, dust, dirt, and other debris can enter the storage compartments and coat the equipment and supplies stored therein. This dust and debris sometimes can impair the function of the same. In addition, valuable time is spent cleaning the supplies and equipment.

Accordingly, there remains room for improving firefighting apparatus for deployment in dusty and dirty environments.

SUMMARY OF THE INVENTION

A firefighting apparatus includes a positive pressure ventilation system for impairing dust, dirt, and other debris from entering one or more storage compartments of the apparatus and/or for evacuating dust, dirt, and other debris from one or more storage compartments, as described in further detail below.

In one embodiment, the firefighting apparatus includes a chassis having a front axle and a rear axle with respective front wheels and rear wheels, a cab mounted to the chassis above the front axle and configured to house occupants, a body separate and rearward of the cab, the body being mounted over the rear axle and including a plurality of storage compartments for equipment, and a positive pressure ventilation system associated with the plurality of storage compartments.

In another embodiment, the ventilation system can include an air intake, a ventilation pathway extending from the air intake to the plurality of storage compartments, a conduit or pipe forming at least a portion of the ventilation pathway and having at least one outlet port in each of the plurality of storage compartments, and a blower assembly associated with the ventilation pathway and optionally provided downstream of the air intake and upstream of the outlet ports.

In still another embodiment, the blower assembly can move air through the pipe to the storage compartments to impair dust from entering and/or settling in the storage compartments, and/or to evacuate dust from the storage compartments, by blowing the air through the outlet ports into and/or through the storage compartments.

In yet another embodiment, a pipe or conduit can include different dimensions along its length to affect air pressure and/or flow through the pipe. For example, when the pipe includes a diameter, the diameter of the pipe can decrease as it extends away from the blower assembly to maintain a substantially constant output of forced air in each storage compartment.

In even another embodiment, an evacuation vent can be disposed in at least one of the plurality of storage compartments. The evacuation vent can include a one-way check valve configured to open upon a determined amount of positive pressure with the interior of the associated storage compartment.

In a further embodiment, the positive pressure ventilation system can include a filter at the air intake.

In even a further embodiment, the positive pressure ventilation system can include a hood extending over the air intake.

In another embodiment, the positive pressure ventilation system can include multiple blower assemblies and ventilation pathways to supply air to different groups of storage compartments.

In yet a further embodiment, a method of impairing contamination of a storage compartment of a firefighting apparatus with dust is provided.

In one embodiment, the method includes providing a firefighting apparatus having a chassis, a cab mounted to the chassis and configured to house occupants, and a body separate from and rearward of the cab, the body including a plurality of storage compartments for equipment, extending a ventilation pathway from an air intake to the storage compartments, forming at least a portion of the ventilation pathway with a pipe having at least one outlet port in each of the storage compartments, and moving air through the pipe toward the storage compartments to blow air through the at least one outlet port, through the storage compartments and out at least one evacuation vent disposed in the storage compartments. Dust in the storage compartments can be blown away from the at least one outlet port and out the at least one evacuation vent to the environment.

The current embodiments provide a simple and effective system for preventing the ingress of environmental dust, dirt, or other debris into the storage compartments of a firefighting apparatus. With a positive pressure ventilation system supplying a positive flow of air to each storage compartment, the pressure within the storage compartments is greater than the environment, and air will egress from the storage compartments into the surrounding environment.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

A current embodiment of a firefighting apparatus is illustrated in FIGS. 1-5 and generally designated 10. As shown, the firefighting apparatus can be in the form of a pumper fire truck that is configured to pump large volumes of firefighting fluid from a fluid source, optionally an on-board tank, through one or more fire hoses, onto a fire to extinguish or suppress the fire, whether a vegetation fire or a structural fire. Although referred to as a firefighting apparatus, as used herein, that term can also include a variety of emergency vehicles, rescue vehicles and other modes of transportation such as aerial ladder trucks, trailers or other equipment. Generally, the apparatus, also referred to herein as a fire truck, can be a self-propelled and mobile vehicle.

The fire truck 10 can include a positive pressure ventilation system 20 for preventing dust, dirt, and other debris from entering one or more storage compartments 60-65 of the fire truck 10, as described in further detail below. With the positive pressure ventilation system 20, the pressure within the storage compartments 60-65 is greater than the environment, and air will egress from the storage compartments 60-65 into the surrounding environment. In other words, there is no ingress of the environment, including any dust, dirt, or other debris, into the storage compartments 60-65.

Figure 2:
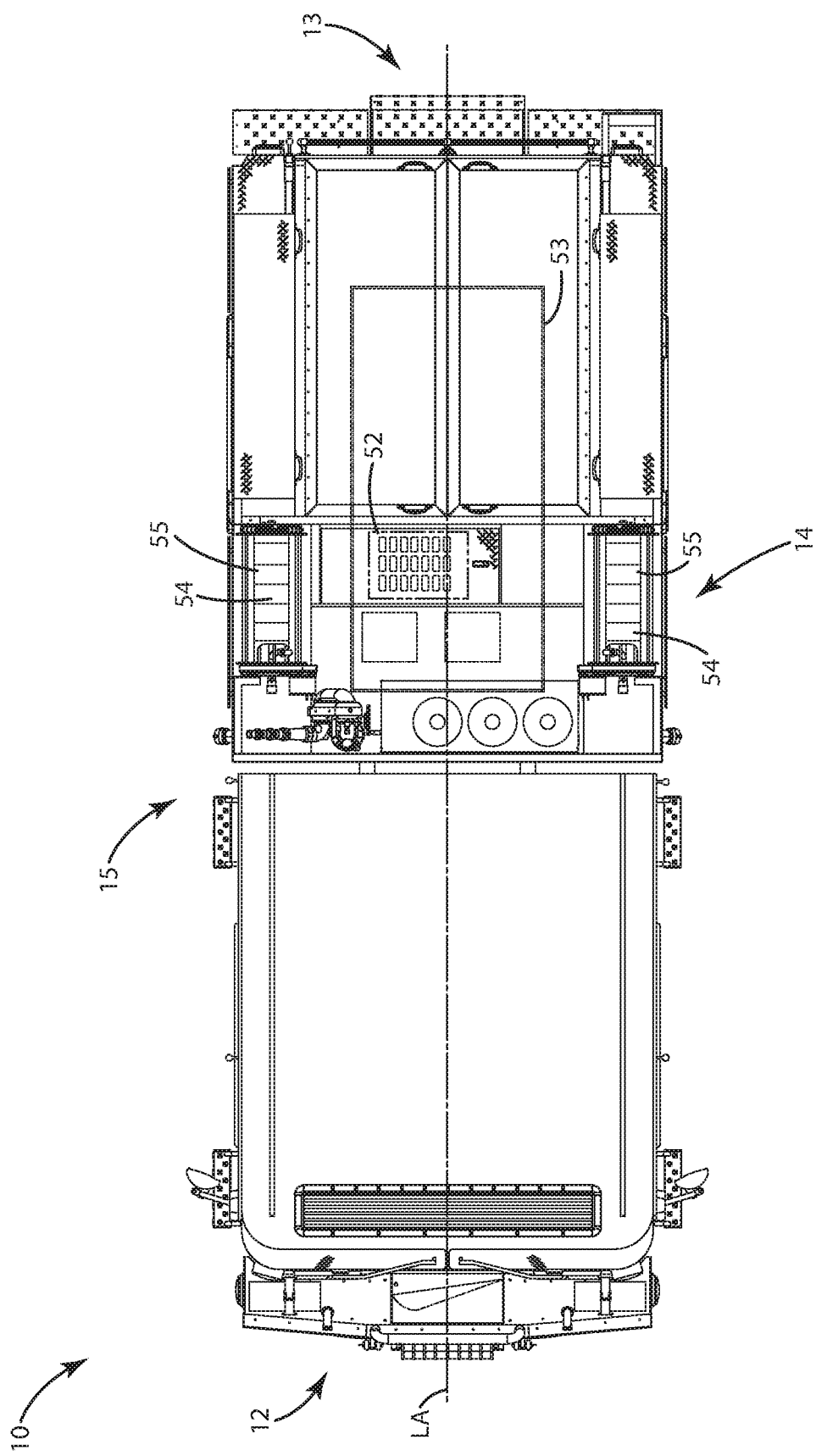
FIG. 2 is a top view of the firefighting apparatus.
Figure 3:
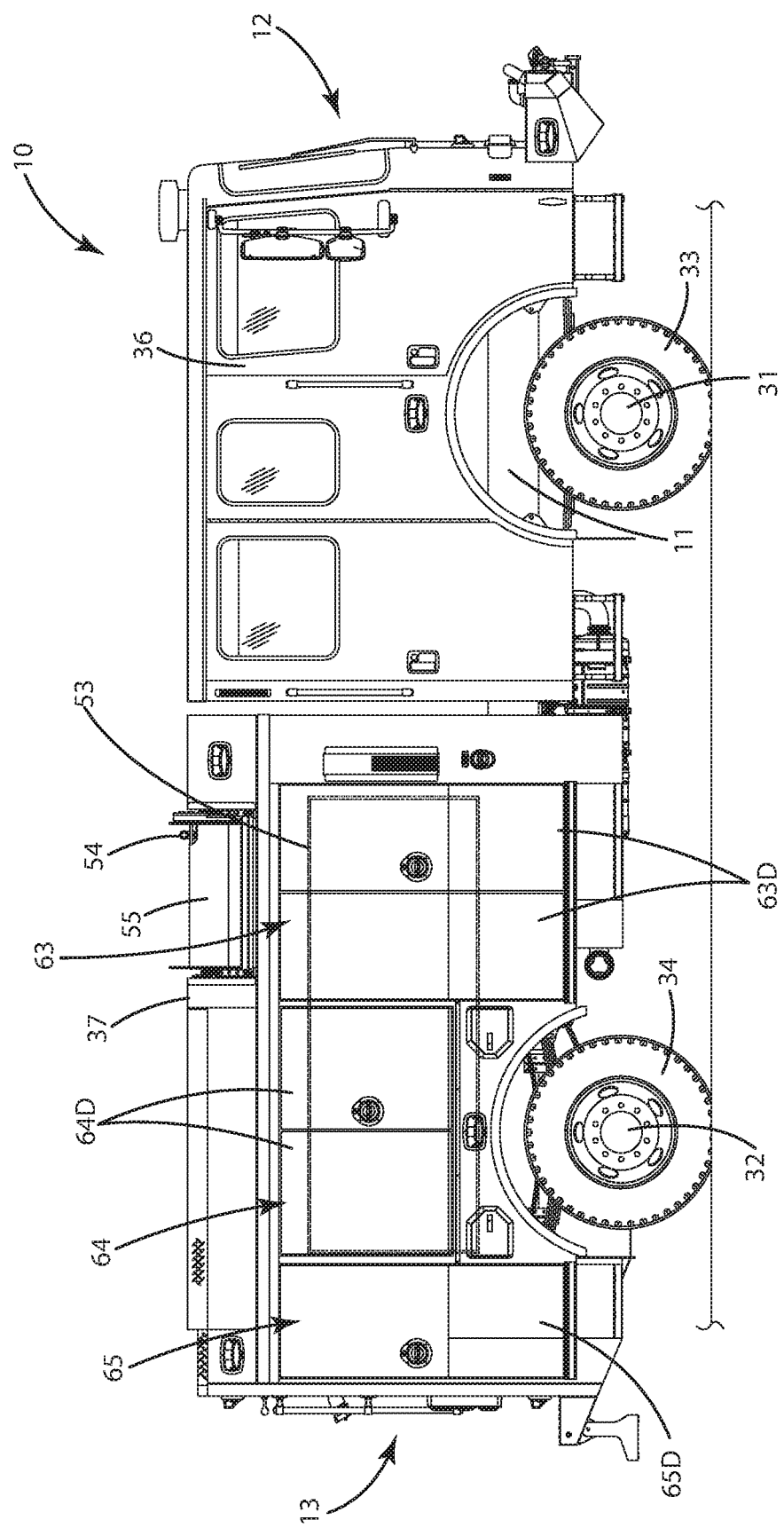
FIG. 3 is a right side view of the firefighting apparatus.

The fire truck 10 can include a forward portion 12 and a rearward portion 13 located at opposite ends of the fire truck 10 with a chassis 11 extending therebetween generally along a longitudinal axis LA of the fire truck 10 that extends generally along the length of the truck, optionally bisecting it as shown in FIG. 2. The fire truck 10 can also include a first lateral side 14 and a second lateral side 15 which are disposed on opposite sides of the longitudinal axis LA that extends generally along the length of the truck 10.

The chassis 11 can be mounted to front and rear axles 31, 32 having wheels 33, 34 attached thereto. Although shown with a single rear axle 32, the apparatus or truck described herein can include multiple rear axles. The fire truck 10 can be mobilized via an internal combustion engine (not shown) which drives the wheels 33, 34 via a transmission. A cab 36 and a body 37 are mounted to the chassis 11.

Generally, the rear wheels 34 and the associated rear axle 32 are located in the rearward portion 13 of the fire truck 10. The front or steering wheels 33 can be located in the forward portion 12 of the fire truck 10. The forward portion 12 can include the cab 36 mentioned above, while the rearward portion 13 can include the body 37.

The fire truck 10 can include one or more internal electronic or computer controls that can operate the engine, transmission, or steering control mechanism to enable the front wheels 33 to be steered upon transport to an emergency location. As used herein, an emergency location or emergency scene can be a scene of a fire, an area with harmful, hazardous, toxic and/or carcinogenic chemicals present, an area of a chemical spill or discharge of any type, a traffic accident, a boating accident, a plane accident, a man-made or natural disaster, and/or a terrorist attack, or any other location where one or more lives or property are endangered or otherwise compromised.

The cab 35 can house occupants, such as firefighters, emergency responders, rescue personnel, or other personnel as they are transported to and from an emergency location. The cab 35 can include a number of seats for the occupants, and can be the portion of the fire truck 10 where the occupants enter and sit in the fire truck 10 for transport. Optionally the cab 35 can be configured to seat at least two, four, six or more occupants. The cab 35 can include conventional controls, such as a steering mechanism and various displays inside the cab 35 to monitor and evaluate the operation of the fire truck 10. In one embodiment, the cab 35 can include a control panel to operate the ventilation system 20, as described in further detail below. The cab 35 can terminate a distance of several feet rearward of the front wheels 33, or generally forward of the pump controls and/or rearward portion 13 of the fire truck 10. The fire truck 10 can include one or more doors 41, 43 that offer ingress and egress into the interior of the cab 35.

The cab 35 can be a flat front cab as shown. The cab 35 also can be a tiltable cab, such that the cab 35 is rotatably and/or otherwise pivotally joined with the chassis 11 and can tilt forwardly. In other embodiment, the cab 35 can include a nose that projects over and includes a hood to cover the engine of the truck 10, and/or the cab 35 might not be tiltable.

The fire truck 10 includes one or more pumps 51, 52, which can be mounted on, above, under or behind the cab 35. In one embodiment, the pump 51 is mounted in a pump house 56 at a forward end of the body 37, behind the cab 35. The pump 51 can be mounted via brackets to the chassis or frame of the truck. The pump 52 can be mounted below an upper deck of the body 37, optionally above a storage tank 53.

Generally, the pumps 51, 52, can be in fluid communication with the storage tank 53, which holds a firefighting fluid or liquid and which can be mounted to the body 37 in the rearward portion 13, and/or in fluid communication with a source of firefighting fluid external to the truck 10, such as a fire hydrant. The pumps 51, 52 also can be in fluid communication with one or more fire hoses 54 mounted on one or more reels 55. One or more of the pumps 51, 52 can be operable when the fire truck 10 is stationary or when the truck is in motion. Optionally, the fire truck 10 can be configured to provide pump and roll capabilities, where the hoses can be spooled off the reels and a firefighter can walk alongside or adjacent the truck 10 while liquid is pumped from the storage tank 53 through one or more of the hoses 54, all while the truck 10 is rolling over terrain. Optionally, the fire truck 10 can further be outfitted with a foam tank (not shown) that can contain a supply of foam used for firefighting in certain activities.

The body 37 can include multiple storage compartments 60-65 sized and configured to store supplies and equipment useful for easy access at an emergency location. The compartments 60-65 can be mounted rearward of the cab 35 in the rearward portion 33 of the fire truck 10. These storage compartments 60-65 optionally can be located on and accessible from one of the lateral sides 14, 15 of the fire truck 10. Multiple storage compartments can fill a substantial portion of the lateral sides 14, 15 in the rearward portion 13 of the fire truck 10. Some compartments can be mounted forward of the rear axle 32, some over the rear axle 32, and some rearward of the rear axle 32. Optionally, the compartments 60-65 on both sides of the truck 10 are mounted laterally outboard from the storage tank 53 mounted on the truck 10. Further optionally, the components 60-65 on both sides of the truck 10 can be mounted laterally outboard from an upper hose storage bed of the truck, or of an upper storage compartment, near the roof or on top of the body 37.

The compartments 60, 61, 62 on the first lateral side 14 of the fire truck 10 can be arranged linearly along the forward/rearward direction, relative to the longitudinal axis LA. In the embodiment shown herein, with three compartments 60, 61, 62 on the first lateral side 14, the compartments are arranged as a forwardmost storage compartment 60, an intermediate storage compartment 61, and rearmost storage compartment 62.

The compartments 63, 64, 65 on the second lateral side 15 of the fire truck 10 can be arranged linearly along the forward/rearward direction, relative to the longitudinal axis LA. In the embodiment shown herein, with three compartments 63, 64, 65 on the second lateral side 15, the compartments are arranged as a forwardmost storage compartment 63, an intermediate storage compartment 64, and rearmost storage compartment 66.

Each compartment 60-65 can include at least one door 60D-65D that opens outwardly away from the longitudinal axis LA of the truck 10. These doors 60D-65D can offer access to an interior 601-651 (FIGS. 4-5) of the storage compartments 60-65 where gear, hoses and other equipment can be stored.

Figure 4:
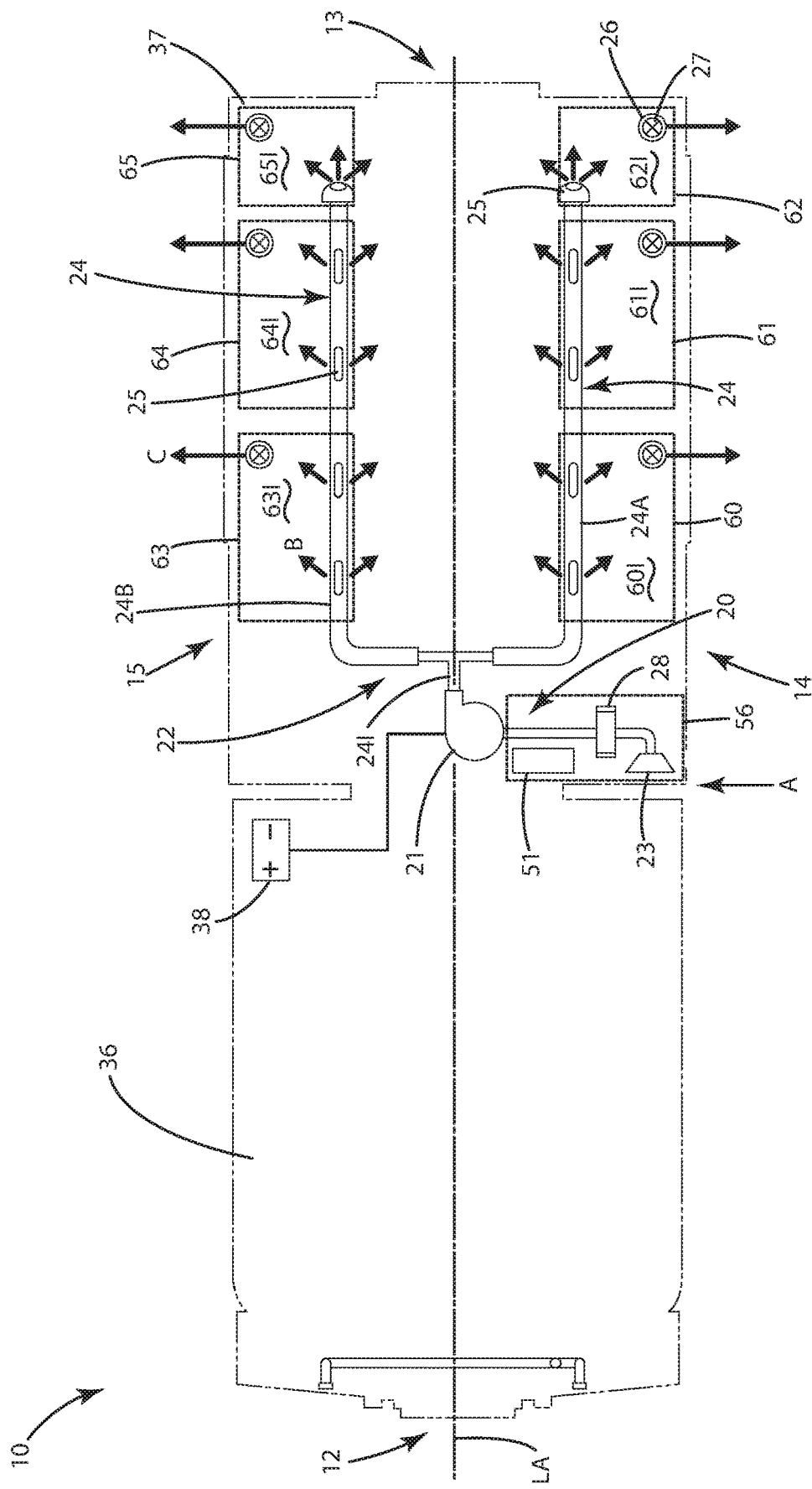
FIG. 4 is a top view schematic of a positive pressure ventilation system of the firefighting apparatus.

Referring to FIG. 4, the positive pressure ventilation system 20 can include a ventilation pathway 22 extending from an air intake 23 to one or more of the storage compartments 60-65. A conduit, tube, or pipe 24, all referred to as a pipe herein, can form at least a portion of the ventilation pathway 22 and can include at least one outlet port 25 in each storage compartment 60-65 ventilated by the system 20. The ventilation system 20 can include a blower assembly 21 that forms part of the ventilation pathway 22, and is provided downstream of the air intake 23 and upstream of the outlet ports 25.

The blower assembly 21 can push, draw or otherwise move air through the pipe 24 to the storage compartments 60-65 to impair dust from entering and/or settling in the storage compartments 60-65, particularly in the interior 601-651 (FIGS. 4-5) of the storage compartments 60-65 where gear, hoses and other equipment can be stored. By pushing a positive air flow at a predetermined output through the outlet ports 25 into the storage compartments 60-65, dust, dirt, and other debris (all of which can be referred to as dust herein) is prevented from entering the compartments 60-65 from the exterior environment.

The pipe 24 can be one or more segments of conduit or tubing forming the ventilation pathway 22 between the blower assembly 21 and the storage compartments 60-65. In the illustrated embodiment, the pipe 24 comprises a manifold having an inlet 241 in fluid communication with the blower assembly 21 and multiple outlets defined by the outlet ports 25 through which air is distributed into the storage compartments 60-65. Downstream of the inlet 241, the pipe 24 branches into a first lateral duct 24A which supplies the compartments 60, 61, 62 on the first lateral side 14 of the fire truck 10 and a second lateral duct 24B which supplies the compartments 63, 64, 65 on the second lateral side 15 of the fire truck 10. As shown, at least of portion of each duct 24A, 24B can extend parallel to the longitudinal axis LA, although other orientations are possible.

Each duct 24A, 24B can include several outlet ports 25 through which air is distributed. Some storage compartments 60-65 can have multiple outlet ports 25. In the illustrated embodiment, the forwardmost and intermediate compartments 60, 61, 63, 64 have two outlet ports 25, while the rearmost compartments 62, 64 have one outlet port 25 each. Other numbers of ports per compartment are possible.

Figure 1:
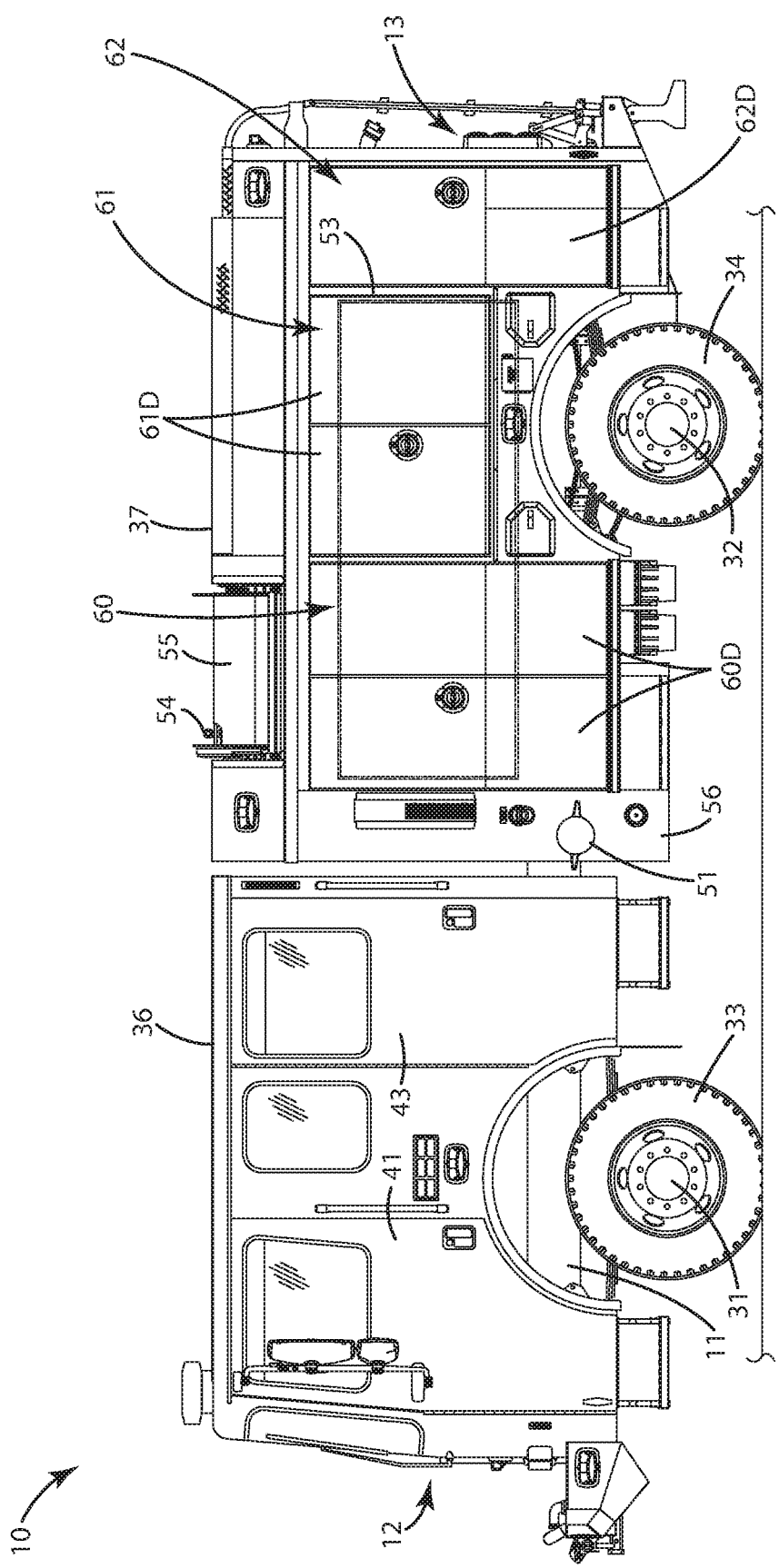
FIG. 1 is a left side view of a firefighting apparatus in the form of a pumper truck according to a current embodiment.

The blower assembly 21 can be provided in the body 37 of the truck 10, such as at a front of the body 37 or forwardly of the storage compartments 60-65, and can include a blower motor and a blower fan operably coupled with and driven by the blower motor. The blower assembly 21 can be forward of the storage tank 53 (FIGS. 1-2). Some non-limiting examples of suitable blower assemblies for the ventilation system 20 include a centrifugal blower or an axial blower. The blower can be an electric blower, powered by an electrical system onboard the truck 10. In some cases herein, the blower assembly can be referred to as an air moving assembly, which can include a blower as well as a vacuum source or other type of device capable of moving air.

Optionally, the ventilation system 20, and in particular, the blower assembly 21, can be powered by a battery 38. The battery 38 can be the standard engine starter battery for the fire truck 10 as shown herein, and may be provided in the forward section 12 of the truck 10. Alternatively, the battery 38 can be an additional battery installed on the fire truck 10. In either case, the blower assembly 21 can be electrically coupled with the battery 38, allowing the ventilation system 20 to run regardless of whether the engine of the fire truck 10 is running. Activation of the blower assembly 21 can be controlled via a control panel in the cab 35, which can include a switch for turning the blower assembly 21 on and off. Alternatively, the ventilation system 20 can be coupled with the ignition system of the fire truck 10, allowing the system 20 to run when the engine of the fire truck 10 is running.

The air intake 23 can be in fluid communication with ambient air, or air exterior of the fire truck 10, and can be provided on the body 37 of the truck 10, such as on an exterior wall of the body 37. In the illustrated embodiment, the air intake 23 is positioned in the space between the cab 36 and the body 37, and faces the forward portion 12 of the truck 10. This location can protect the air intake 23 and can minimize water, dust, dirt, and other debris from entering the air intake 23. Alternatively, the air intake 23 can be provided on one of the lateral sides 14, 15 of the truck 10.

The ventilation system 20 can include at least one air outlet through which air is exhausted from the ventilation pathway 22, exteriorly of the fire truck 10. In the illustrated embodiment, the at least one air outlet comprises evacuation vents 26 are provided in each compartment 60-65. In some embodiments, the evacuation vents 26 are distal from or otherwise spaced away from any outlet ports 25 in the associated storage compartment. The evacuation vents 26 can vent air directly to the ambient environment, or the air from each vent 26 can be combined downstream of the compartments 60-65, such as by an outlet manifold, and then collectively vented to the environment via one exhaust outlet.

Optionally, the ports 25 and evacuation vents 26 are placed distal from one another in such a way so as to somewhat take advantage of gravity such that dust, dirt and debris that enters the compartments 60-65 is flushed downward, through the compartment and out the vents 26. In such a construction, the pipe 24 and/or ports 25 can be disposed in an upper ¼ or upper ½ portion of the compartment, with the vents 26 disposed on a lower ¼ or lower ½ portion of the compartment. In such a configuration fluid or air blown under force and pressure from the port 25 will blow dust, dirt and debris in the compartment 60-65 generally vertically downward toward the vent 26. With such blowing, those items can also generally fall toward the vent 26. The compartment 60-65 with its port 25 and vent 26 also optionally can be considered an open air flow system, that is, there is both input of fluid or air into the compartment 60-65 at the port 25, and exhaust of that fluid or air from the vents 26. Thus, the fluid or air optionally does not necessarily pressurize the compartment 60-65, but rather provides flow through the compartment 60-65 to evacuate the dirt, debris and dust that may have already entered the compartment 60-65. Further optionally, this can be difficult for a fully pressurized system where air recirculates around and inside the compartment 60-65. In such a construction, there likely would be no evacuation vent 26. In turn, any dirt, dust or debris that entered the compartment 60-65 might simply be swirled around inside the compartment 60-65, further embedding the same on the supplies and equipment. With the current system, those materials and the flowing fluid or air can exit the compartments 60-65.

In some embodiments, the evacuation vents 26 can comprise one-way check or non-return valves 27 to regulate the pressure within the interior 601-651 of the compartment 60-65 associated with the valve 27. The valves 27 are normally closed in a closed mode, and are configured to open to an open mode upon a determined amount of positive pressure with the interior 601-651. As such, ingress of dirt or debris at the evacuation vent 26 is prevented by the valve 27. Optionally, the positive pressure generated by the blower assembly 21 may be great enough to prevent this. Further optionally, the valves 27 can open to an open mode upon a particular pressure in the compartment 60-65, for example, optionally at least 10 psi, at least 20 psi, at least 30 psi, or more. When the valves 27 open, any dirt, dust and debris in the compartment 60-65 can be blown out the vents 26. The blowing also can be sufficient to blow dust on the exterior away from the vents 26 so the same does not enter the compartment 60-65 through the vents 26.

In other embodiments, evacuation vents 26 can be provided in the doors 60D-65D, or dedicated evacuation vents 26 may not be necessary if the air gaps around the doors 60D-65D are sufficiently large so as to define the at least one air outlet. Due to the positive pressure generated by the blower assembly 21, forced air can leak through these air gaps around the doors 60D-65D to prevent the ingress of dust and other debris.

In at least some embodiments of the ventilation system 20, a filter 28 can be provided in the ventilation pathway 22. Ambient air can be drawn in by the blower assembly 21 through the air intake 23 and passed through the filter 28 before passing into the interior 601-651 of the storage compartments 60-65. The filter 28 can be provided at the air intake 23, or anywhere in the ventilation pathway 22 between the air take 23 and the inlet to the blower assembly 21. In the illustrated embodiment, the filter 28 is mounted in the pump house 56 at a forward end of the body 37, behind the cab 35. As an alternative or in addition, a filter can be provided downstream of an outlet from the blower assembly 21 and upstream of the outlet ports 25, or individual filters can be provided at each outlet port 25 to filter the air prior to entering the storage compartments 60-65. The filter 28 can comprise any filter media, such as a fibrous or porous material, that removes dust from the air.

Figure 5:
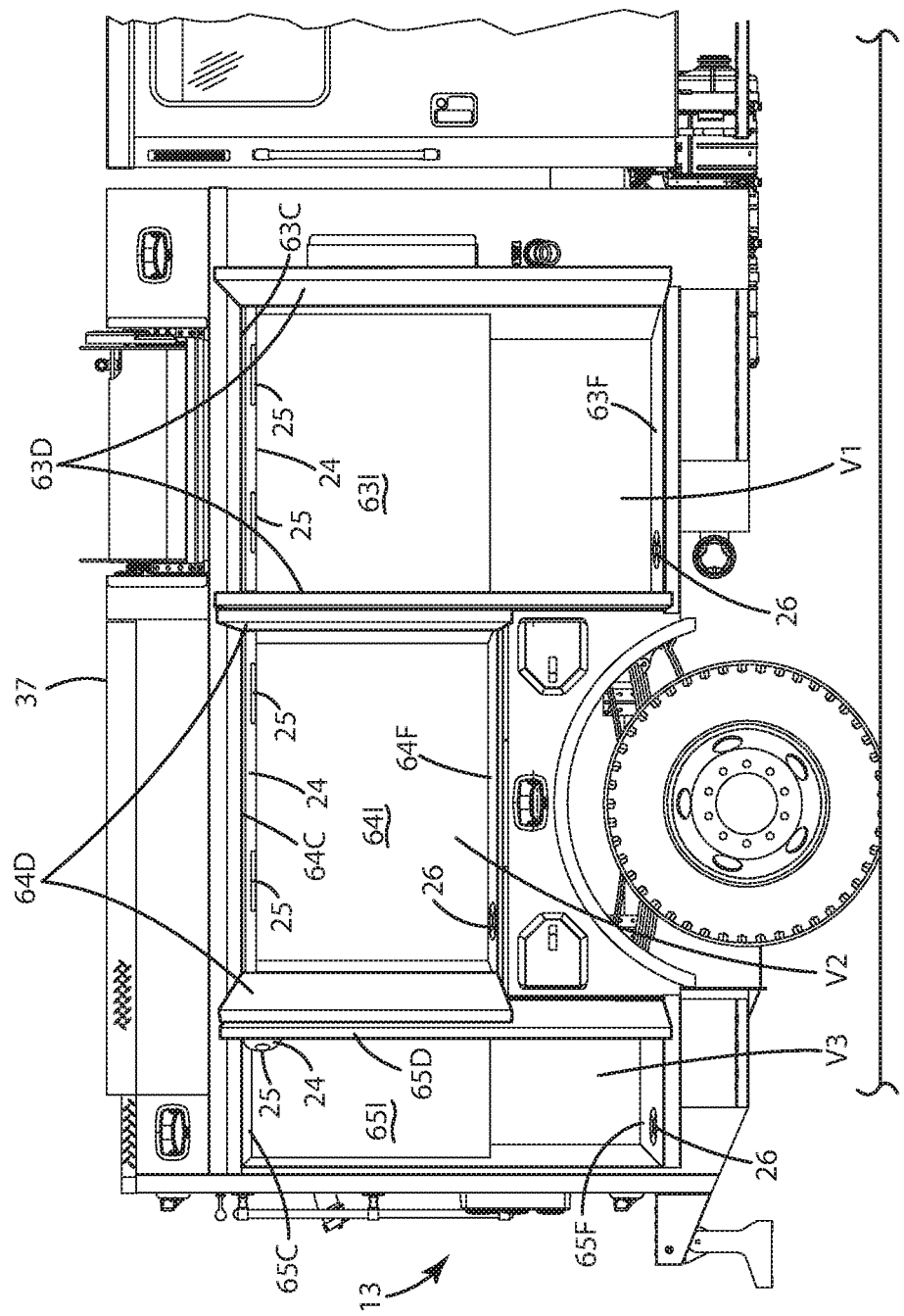
FIG. 5 is a right side view of a rearward portion of the firefighting apparatus, with storage compartment doors open to illustrate aspects of the positive pressure ventilation system.

FIG. 5 is a right side view of the rearward portion 13 of the fire truck 10. The fire truck 10 is shown with the doors 63D-65D of compartments 63, 64, 65 opened to show the pipe 24 on the second lateral side 15 of the fire truck 10, but it is understood that the pipe 24 for the compartments 60, 61, 62 on the first lateral side 14 of the fire truck 10 can be similar. As illustrated, the pipe 24 runs along a ceiling 63C-65C of the storage compartments 63-65. The evacuation vents 26 are distal from or otherwise spaced away from the ceiling 63C-65C. As shown, the evacuation vents 26 are on the floor 60F-65F of each compartment 60-65, although other locations are possible.

The number of ports 25 per compartment may be dependent on the size or volume of the compartment. In the illustrated embodiment, the forwardmost compartment 63 has a first volume V1, the intermediate compartment 64 has a second volume V2, and the rearmost compartment 65 have a third volume V3, which may be smaller than V1 and V2. Larger volume compartments, such as 63 and 64 in the illustrated embodiment, can have more ports 25 in order to provide a roughly uniform flow distribution to all compartments 63-65 on the ventilation system 20. The actual output to each compartment 63-65 can be equal across all compartments 63-65, or the required output to each compartment 63-65 for a positive pressure may vary based on the volume of the compartment and its location along the ventilation pathway 22.

The volume of the compartments 63-65 can also affect the sizing of the pipe 24. Air flow in cubic feet per minute (CFM) is dependent on flow velocity and the cross-sectional area of the pipe 24. In the illustrated embodiment, for the forwardmost and intermediate compartments 63, 64 having larger volumes V1, V2, the cross-sectional area of the pipe 24 may be larger in order to provide the required air flow for positive pressure. For the rearmost compartment 65 having the smaller volume V3, the cross-sectional area of the pipe 24 can be smaller in order to provide the required air flow for positive pressure. In general, the diameter of the pipe 24 and the number of outlet ports 25 can be configured for each compartment 60-65 in order to provide a predetermined air flow for positive pressure within said compartment.

In operation, upon activation of the blower assembly 21, ambient air, or air exterior of the fire truck 1, represented by arrow A, enters through the intake 23 and passes through the filter 28 before reaching the blower assembly 21. The blower assembly 21 pushes the filtered air, represented by arrow B, into the inlet 241 of the pipe 24, through each duct 24A, 24B, and out of the outlet ports 25 into the interiors 601-651 of the storage compartments 60-65. By pushing a positive air flow at a predetermined output through the outlet ports 25 into the storage compartments 60-65, the interiors 601-651 of the storage compartments 60-65 are at a positive pressure, i.e. higher than ambient air A, and dust, dirt, and other debris is prevented from entering the compartments 60-65 from the exterior environment. Again, the air can be exhausted from the ventilation system 20 through the evacuation vents 26 provided in each compartment 60-65, as represented by arrow C, optionally through one-way check valves 27. Any dust dirt, and other debris that previously entered into the compartment 60-65 also can be exhausted under the forced air through the evacuation vents 26, with the compartment operating as an open air system, where air enters through the ports 25, flows through the compartment 60-65, and out the evacuation vents 26.

Figure 6:
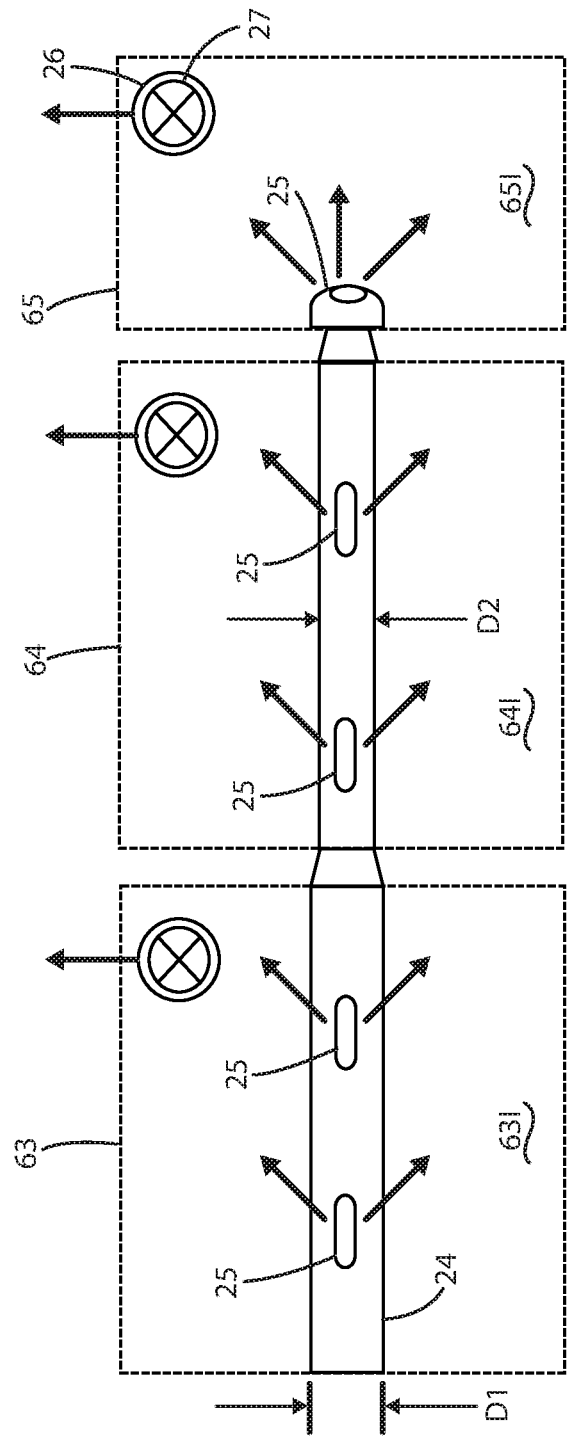
FIG. 6 is a top view schematic of a ventilation pipe for a first alternative embodiment of a positive pressure ventilation system of the firefighting apparatus.

Optionally, as shown in another embodiment of FIG. 6, a dimension, for example a diameter, of the pipe 24 can change along the length of the ventilation pathway 22. In FIG. 6, the pipe 24 is shown for the compartments 63, 64, 65 on the second lateral side 15 of the fire truck 10, but it is understood that the pipe 24 for the compartments 60, 61, 62 on the first lateral side 14 of the fire truck 10 can be similar. In the illustrated embodiment, the diameter of the pipe 24 (i.e. the inner diameter) can decrease in the downstream direction, i.e. as it extends away from the blower assembly 21. Particularly, a diameter D1 of the pipe 24 in the forwardmost storage compartment 63 is greater than a diameter D2 of the pipe 24 in the intermediate storage compartment 64, which is reward of compartment 63. To reduce the diameter, the pipe 24 can have at least one constriction downstream of the blower assembly 21 to reduce the inner diameter of the pipe 24 to maintain a relatively constant forced air and/or pressure output in each storage compartment 60-65. The overall or outer diameter of the pipe 24 can also decrease, as shown herein. Optionally, the diameter or dimension of the pipe 24 can decrease in steps, or gradually. For example, the pipe 24 can include first and second sections of different constant diameters over lengths of the sections, for example at least 2, 3, 4, 5 or more feet of the sections. An adapter can join those different diameter pipes at a junction as shown.

In other embodiments, the diameter of the pipe 24 (i.e. the inner diameter) can increase in the downstream direction, i.e. as it extends away from the blower assembly 21, to maintain a relatively constant output in each storage compartment 63-65. Whether via a decrease or increase, the diameter of the pipe 24 can change along the length of the ventilation pathway 22 to maintain a relatively constant output in each storage compartment 63-65 or to provide a certain output required for positive pressure in each storage compartment 63-65.

Figure 7:
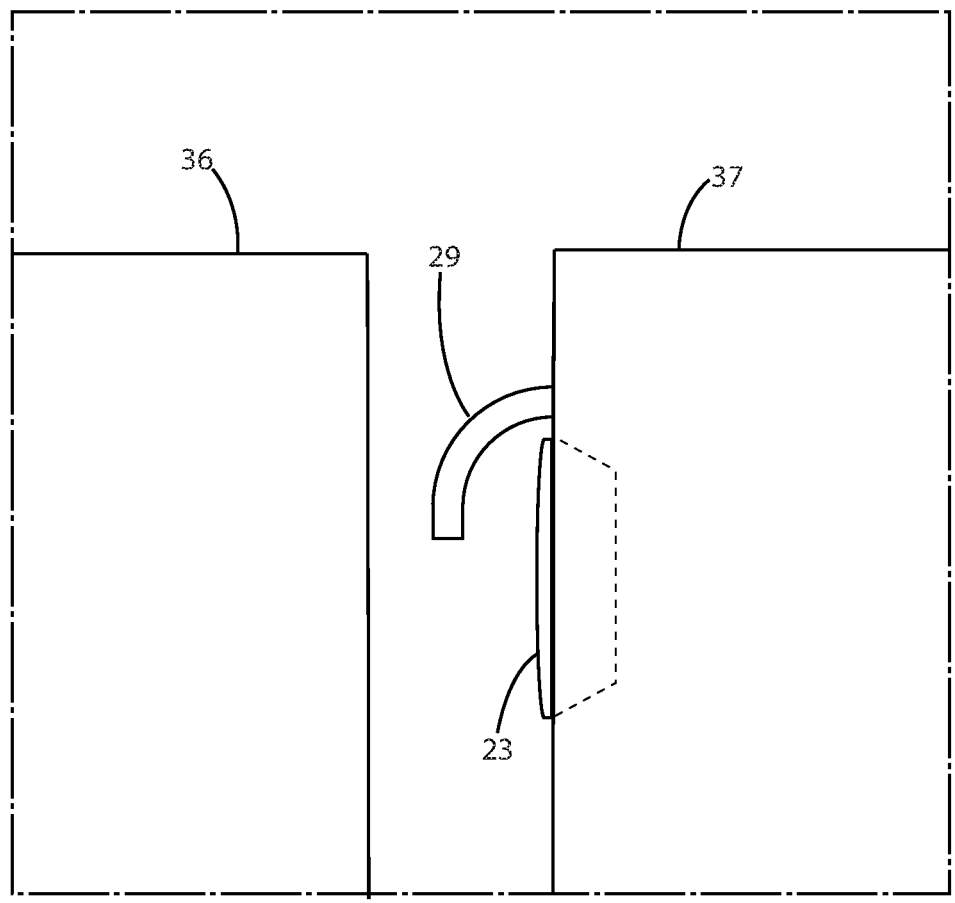
FIG. 7 is a close up side view of a hood for an air intake of an alternative embodiment of a positive pressure ventilation system of the firefighting apparatus.

Referring to FIG. 7, in another embodiment, an optional hood 29 can extend over the air intake 23 to further minimize water, dust, dirt, and other debris from entering the air intake 23. In the illustrated embodiment, the air intake 23 is positioned in the space between the cab 36 and the body 37, and the hood 29 projects from the body 37 and into the space between the cab 36 and the body 37 to extend at least partially over and/or around the air intake 23.

Figure 8:
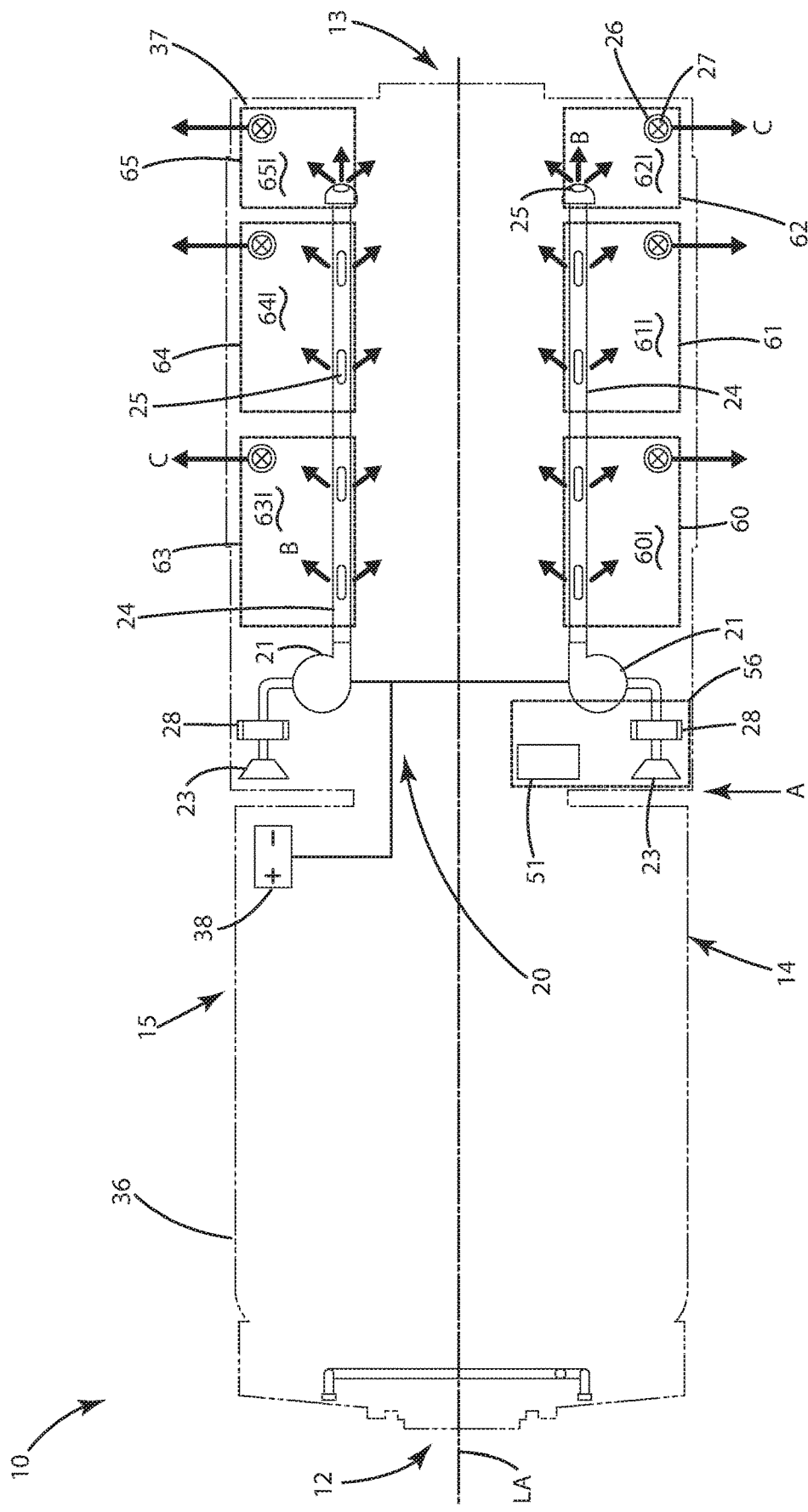
FIG. 8 is a top view schematic of a second alternative embodiment of a positive pressure ventilation system of the firefighting apparatus.

Referring to FIG. 8, in another embodiment, the positive pressure ventilation system 20 can have multiple blower assemblies 21 and ventilation pathways 22 to supply air to different groups of the storage compartments 60-65. For instance, one blower assembly 21 can supply air to the group of storage compartments 60-62 located on the first lateral side 14 of the fire truck 10 and the other blower assembly 21 can supply air to the group of storage compartments 63-65 located on the second lateral side 15 of the fire truck 10. Likewise, air intakes 23, pipes 24, and filters 28 can also be provided for each group of storage compartments 60-62, 63-65, and with one air intake 23, pipe 24, and filter 28 located to the first lateral side 14 of the fire truck 10, relative to the longitudinal axis LA, and the other air intake 23, pipe 24, and filter 28 located to the second lateral side 14 of the fire truck 10, relative to the longitudinal axis LA. The blower assemblies 21 can be individually controllable in order to provide ventilation to each group of storage compartments 60-62, 63-65 on demand.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A firefighting apparatus comprising:
    a chassis having a front axle and a rear axle with respective front wheels and rear wheels;
    a cab mounted to the chassis above the front axle and configured to house occupants;
    a body separate and rearward of the cab, the body being mounted over the rear axle and including a plurality of storage compartments for equipment;
    a pump mounted to the chassis and configured to pump liquid through a hose distal from the chassis; and
    a positive pressure ventilation system associated with the plurality of storage compartments, the positive pressure ventilation system comprising:
        an air intake;
        a ventilation pathway extending from the air intake to the plurality of storage compartments;
        a pipe forming at least a portion of the ventilation pathway and having at least one outlet port in each of the plurality of storage compartments; and
        a blower assembly in fluid communication with the ventilation pathway and disposed downstream of the air intake and upstream of the at least one outlet port in each of the plurality of storage compartments;
wherein the blower assembly moves air through the pipe to the plurality of storage compartments to at least one of impair dust from entering and evacuate dust from the plurality of storage compartments by blowing the air through the outlet ports into the storage compartments,
wherein the pipe includes an internal dimension that varies as the pipe extends away from the blower.

2. A firefighting apparatus comprising:
a chassis having a front axle and a rear axle with respective front wheels and rear wheels;
a cab mounted to the chassis above the front axle and configured to house occupants;
a body separate and rearward of the cab, the body being mounted over the rear axle and including a plurality of storage compartments for equipment;
a pump mounted to the chassis and configured to pump liquid through a hose distal from the chassis; and
a positive pressure ventilation system associated with the plurality of storage compartments, the positive pressure ventilation system comprising:
an air intake;
a ventilation pathway extending from the air intake to the plurality of storage compartments;
a pipe forming at least a portion of the ventilation pathway and having at least one outlet port in each of the plurality of storage compartments; and
a blower assembly in fluid communication with the ventilation pathway and disposed downstream of the air intake and upstream of the at least one outlet port in each of the plurality of storage compartments;
wherein the blower assembly moves air through the pipe to the plurality of storage compartments to at least one of impair dust from entering and evacuate dust from the plurality of storage compartments by blowing the air through the outlet ports into the storage compartments;
wherein the pipe includes a diameter; and
wherein the diameter of the pipe decreases as the pipe extends away from the blower assembly to maintain a substantially constant output of forced air in each of the plurality of storage compartments.

3. The firefighting apparatus of claim 1 comprising:
a liquid storage tank mounted on the chassis; and
a longitudinal axis extending along the chassis from a forward portion of the apparatus to a rearward portion of the apparatus through the liquid tank;
wherein the plurality of storage compartments are arranged linearly along the longitudinal axis to define at least a forward storage compartment and a rear storage compartment;
wherein the forward storage compartment and rear storage compartment are mounted laterally outboard from the liquid storage tank.

4. A firefighting apparatus comprising:
a chassis having a front axle and a rear axle with respective front wheels and rear wheels;
a cab mounted to the chassis above the front axle and configured to house occupants;
a body separate and rearward of the cab, the body being mounted over the rear axle and including a plurality of storage compartments for equipment;
a pump mounted to the chassis and configured to pump liquid through a hose distal from the chassis; and
a positive pressure ventilation system associated with the plurality of storage compartments, the positive pressure ventilation system comprising:
an air intake;
a ventilation pathway extending from the air intake to the plurality of storage compartments;
a pipe forming at least a portion of the ventilation pathway and having at least one outlet port in each of the plurality of storage compartments; and
a blower assembly in fluid communication with the ventilation pathway and disposed downstream of the air intake and upstream of the at least one outlet port in each of the plurality of storage compartments;
wherein the blower assembly moves air through the pipe to the plurality of storage compartments to at least one of impair dust from entering and evacuate dust from the plurality of storage compartments by blowing the air through the outlet ports into the storage compartments;
wherein the pipe includes a first internal dimension and a second internal dimension;
wherein the first internal dimension of the pipe in the rear storage compartment is different than the second internal dimension of the pipe in the forward storage compartment.

5. A firefighting apparatus comprising:
a chassis having a front axle and a rear axle with respective front wheels and rear wheels;
a cab mounted to the chassis above the front axle and configured to house occupants;
a body separate and rearward of the cab, the body being mounted over the rear axle and including a plurality of storage compartments for equipment;
a pump mounted to the chassis and configured to pump liquid through a hose distal from the chassis; and
a positive pressure ventilation system associated with the plurality of storage compartments, the positive pressure ventilation system comprising:
an air intake;
a ventilation pathway extending from the air intake to the plurality of storage compartments;
a pipe forming at least a portion of the ventilation pathway and having at least one outlet port in each of the plurality of storage compartments; and
a blower assembly in fluid communication with the ventilation pathway and disposed downstream of the air intake and upstream of the at least one outlet port in each of the plurality of storage compartments;
wherein the blower assembly moves air through the pipe to the plurality of storage compartments to at least one of impair dust from entering and evacuate dust from the plurality of storage compartments by blowing the air through the outlet ports into the storage compartments;
wherein the positive pressure ventilation system comprises at least one air outlet through which air is exhausted from the ventilation pathway, and out of at least one of the plurality of storage compartments and into the surrounding environment;
wherein the at least one air outlet comprises an evacuation vent disposed in the at least one of the plurality of storage compartments.

6. The firefighting apparatus of claim 5,
wherein each evacuation vent comprises a valve configured to open upon a predetermined amount of pressure within an interior of a selected storage compartment.

7. A firefighting apparatus comprising:
a chassis having a front axle and a rear axle with respective front wheels and rear wheels;
a cab mounted to the chassis above the front axle and configured to house occupants;

a body separate and rearward of the cab, the body being mounted over the rear axle and including a plurality of storage compartments for equipment;

a pump mounted to the chassis and configured to pump liquid through a hose distal from the chassis; and a positive pressure ventilation system associated with the plurality of storage compartments, the positive pressure ventilation system comprising:
- an air intake;
- a ventilation pathway extending from the air intake to the plurality of storage compartments;
- a pipe forming at least a portion of the ventilation pathway and having at least one outlet port in each of the plurality of storage compartments; and
- a blower assembly in fluid communication with the ventilation pathway and disposed downstream of the air intake and upstream of the at least one outlet port in each of the plurality of storage compartments;

wherein the blower assembly moves air through the pipe to the plurality of storage compartments to at least one of impair dust from entering and evacuate dust from the plurality of storage compartments by blowing the air through the outlet ports into the storage compartments;

wherein the pipe comprises a manifold having an inlet in fluid communication with the blower assembly and a plurality of outlets defined by the at least one outlet port through which air is distributed into the plurality of storage compartments;

wherein the plurality of storage compartments comprise a first group of storage compartments located on a first lateral side of the apparatus and a second group of storage compartments located on an opposing second lateral side of the apparatus;

wherein the manifold comprises a first lateral duct that supplies air to the first group of storage compartments and a second lateral duct that supplies air to the second group of storage compartments.

8. A firefighting apparatus comprising:

a chassis having a front axle and a rear axle with respective front wheels and rear wheels;

a cab mounted to the chassis above the front axle and configured to house occupants;

a body separate and rearward of the cab, the body being mounted over the rear axle and including a plurality of storage compartments for equipment;

a pump mounted to the chassis and configured to pump liquid through a hose distal from the chassis; and a positive pressure ventilation system associated with the plurality of storage compartments, the positive pressure ventilation system comprising:
- an air intake;
- a ventilation pathway extending from the air intake to the plurality of storage compartments;
- a pipe forming at least a portion of the ventilation pathway and having at least one outlet port in each of the plurality of storage compartments; and
- a blower assembly in fluid communication with the ventilation pathway and disposed downstream of the air intake and upstream of the at least one outlet port in each of the plurality of storage compartments;

wherein the blower assembly moves air through the pipe to the plurality of storage compartments to at least one of impair dust from entering and evacuate dust from the plurality of storage compartments by blowing the air through the outlet ports into the storage compartments;

wherein the positive pressure ventilation system comprises at least two outlet ports in at least one of the storage compartments.

9. The firefighting apparatus of claim 1,
wherein a first one of the plurality of storage compartments has a first volume and a second one of the plurality of storage compartments has a second volume that is smaller than the first volume.

10. A firefighting apparatus comprising:

a chassis having a front axle and a rear axle with respective front wheels and rear wheels;

a cab mounted to the chassis above the front axle and configured to house occupants;

a body separate and rearward of the cab, the body being mounted over the rear axle and including a plurality of storage compartments for equipment;

a pump mounted to the chassis and configured to pump liquid through a hose distal from the chassis; and a positive pressure ventilation system associated with the plurality of storage compartments, the positive pressure ventilation system comprising:
- an air intake;
- a ventilation pathway extending from the air intake to the plurality of storage compartments;
- a pipe forming at least a portion of the ventilation pathway and having at least one outlet port in each of the plurality of storage compartments; and
- a blower assembly in fluid communication with the ventilation pathway and disposed downstream of the air intake and upstream of the at least one outlet port in each of the plurality of storage compartments;

wherein the blower assembly moves air through the pipe to the plurality of storage compartments to at least one of impair dust from entering and evacuate dust from the plurality of storage compartments by blowing the air through the outlet ports into the storage compartments;

wherein the at least one outlet port is located in an upper half of one of the plurality of storage compartments;

wherein an evacuation vent is located in a bottom half of the one of the plurality of storage compartments; and wherein the positive pressure ventilation system is an open air system so that air in the compartment enters the upper half through the at least one outlet port, travels downward into the lower half, and blows dust in the compartment generally downward and out the evacuation vent.

11. The firefighting apparatus of claim 1, wherein the positive pressure ventilation system comprises a filter at the air intake and a hood extending over the air intake.

12. The firefighting apparatus of claim 11, comprising:
a pump mounted in a pump house a forward of the body, behind the cab;
wherein the filter is mounted in the pump house.

13. A firefighting apparatus comprising:

a chassis having a front axle and a rear axle with respective front wheels and rear wheels;

a cab mounted to the chassis above the front axle and configured to house occupants;

a body separate and rearward of the cab, the body being mounted over the rear axle and including a plurality of storage compartments for equipment;

a pump mounted to the chassis and configured to pump liquid through a hose distal from the chassis; and a positive pressure ventilation system associated with the plurality of storage compartments, the positive pressure ventilation system comprising:
an air intake;

a ventilation pathway extending from the air intake to the plurality of storage compartments;
a pipe forming at least a portion of the ventilation pathway and having at least one outlet port in each of the plurality of storage compartments; and
a blower assembly in fluid communication with the ventilation pathway and disposed downstream of the air intake and upstream of the at least one outlet port in each of the plurality of storage compartments;
wherein the blower assembly moves air through the pipe to the plurality of storage compartments to at least one of impair dust from entering and evacuate dust from the plurality of storage compartments by blowing the air through the outlet ports into the storage compartments;
wherein an evacuation vent located distal from the at least one outlet port is configured so that air entering the respective compartment can travel through the compartment to exit to the environment through the evacuation vent.

14. The firefighting apparatus of claim 13,
wherein the plurality of storage compartments are arranged linearly along the longitudinal axis, but located laterally outboard from a liquid storage tank mounted to the chassis.

15. A firefighting apparatus comprising:
a chassis having a front axle and a rear axle with respective front wheels and rear wheels;
a cab mounted to the chassis above the front axle and configured to house occupants;
a body separate and rearward of the cab, the body being mounted over the rear axle and including a plurality of storage compartments for equipment, the plurality of storage compartments including a first group of storage compartments located on a first lateral side of the apparatus and a second group of storage compartments located on a second lateral side of the apparatus;
a positive pressure ventilation system for the storage compartments, comprising:
 a first ventilation pathway extending from a first air intake to the first group of storage compartments;
 a first pipe forming at least a portion of the first ventilation pathway and having at least one first outlet port in each of the first group of storage compartments;
 a first air moving assembly forming part of the first ventilation pathway and provided downstream of the first air intake and upstream of the outlet ports;
 at least one evacuation vent located below the at least one first outlet port in each of the first group of storage compartments;
wherein the first air moving assembly moves air through the first pipe to the first group of storage compartments to at least one of impair dust from entering and evacuate dust in the first group of storage compartments by blowing the air through the first outlet ports into the first group of storage compartments,
wherein the positive pressure ventilation system is an open air system so that air enters each of the first group of storage compartments through the at least one outlet port, travels generally downward and out the evacuation vent.

16. A method of impairing contamination of a storage compartment of a firefighting apparatus with dust, the method comprising:
providing a firefighting apparatus having a chassis, a cab mounted to the chassis and configured to house occupants, and a body separate from and rearward of the cab, the body including a plurality of storage compartments for equipment;
extending a ventilation pathway from an air intake to the plurality of storage compartments;
forming at least a portion of the ventilation pathway with a pipe having at least one outlet port in each of the plurality of storage compartments; and
moving air through the pipe toward the plurality of storage compartments to blow air through the at least one outlet port, through the plurality of storage compartments and out at least one evacuation vent disposed in the plurality of storage compartments,
wherein any dust in the plurality of storage compartments is blown away from the at least one outlet port and out the at least one evacuation vent to the environment;
wherein the at least one outlet port is disposed in an upper portion of one of the plurality of storage compartments;
wherein the at least one evacuation vent is disposed in a lower portion of the one of the plurality of storage compartments; and
wherein the air blown through the at least one outlet port blows dust downward in the one of the plurality of storage compartments toward and out the at least one evacuation vent.

17. The method of claim 16,
wherein the at least one outlet port is disposed in an upper half of the one of the plurality of storage compartments;
wherein the at least one evacuation vent is disposed in a lower half of the one of the plurality of storage compartments; and
wherein the dust moves downward, toward the evacuation vent, when blown with the air.

18. A method of impairing contamination of a storage compartment of a firefighting apparatus with dust, the method comprising:
providing a firefighting apparatus having a chassis, a cab mounted to the chassis and configured to house occupants, and a body separate from and rearward of the cab, the body including a plurality of storage compartments for equipment;
extending a ventilation pathway from an air intake to the plurality of storage compartments;
forming at least a portion of the ventilation pathway with a pipe having at least one outlet port in each of the plurality of storage compartments; and
moving air through the pipe toward the plurality of storage compartments to blow air through the at least one outlet port, through the plurality of storage compartments and out at least one evacuation vent disposed in the plurality of storage compartments,
wherein any dust in the plurality of storage compartments is blown away from the at least one outlet port and out the at least one evacuation vent to the environment;
wherein the evacuation vent includes a one-way valve; and
wherein the air blown through the plurality of storage compartments converts the one-way valve from a normally closed mode to an open mode so that air and dust exits the plurality of storage compartments through the one-way valve.

\* \* \* \* \*